United States Patent [19]
Yamanaka et al.

[11] 4,059,839
[45] Nov. 22, 1976

[54] SOLID STATE CAMERA

[75] Inventors: Seisuke Yamanaka, Mitaka; Fumio Nagumo, Koshigaya, both of Japan

[73] Assignee: Sony Corporation, Tokyo, Japan

[21] Appl. No.: 656,299

[22] Filed: Feb. 9, 1976

[30] Foreign Application Priority Data

Feb. 14, 1975 Japan .................................. 50-18593

[51] Int. Cl.² .............................................. H04N 9/07
[52] U.S. Cl. ...................................................... 358/44
[58] Field of Search ................... 358/41, 43, 44–48, 358/55

[56] References Cited

FOREIGN PATENT DOCUMENTS 4,104,972  10/1972  Japan ................................ 358/41

*Primary Examiner*—Robert L. Richardson
*Attorney, Agent, or Firm*—Hill, Gross, Simpson, Van Santen, Steadman, Chiara & Simpson

[57] ABSTRACT

A solid state color camera such as one-chip type CCD (charge coupled device) color camera having a color filter employed in association with the CCD chip and arranged so that an output signal derived from every other sequential line of scan includes only color component signals of the object being sensed.

7 Claims, 19 Drawing Figures

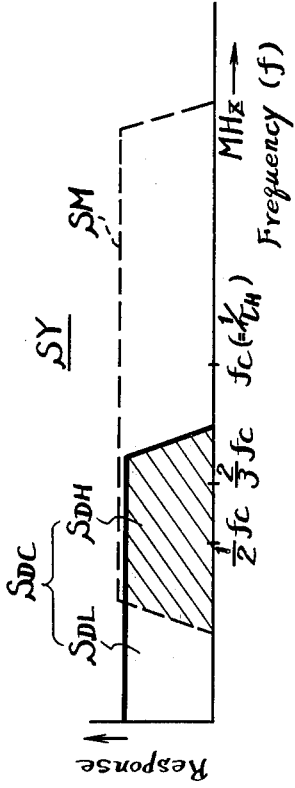
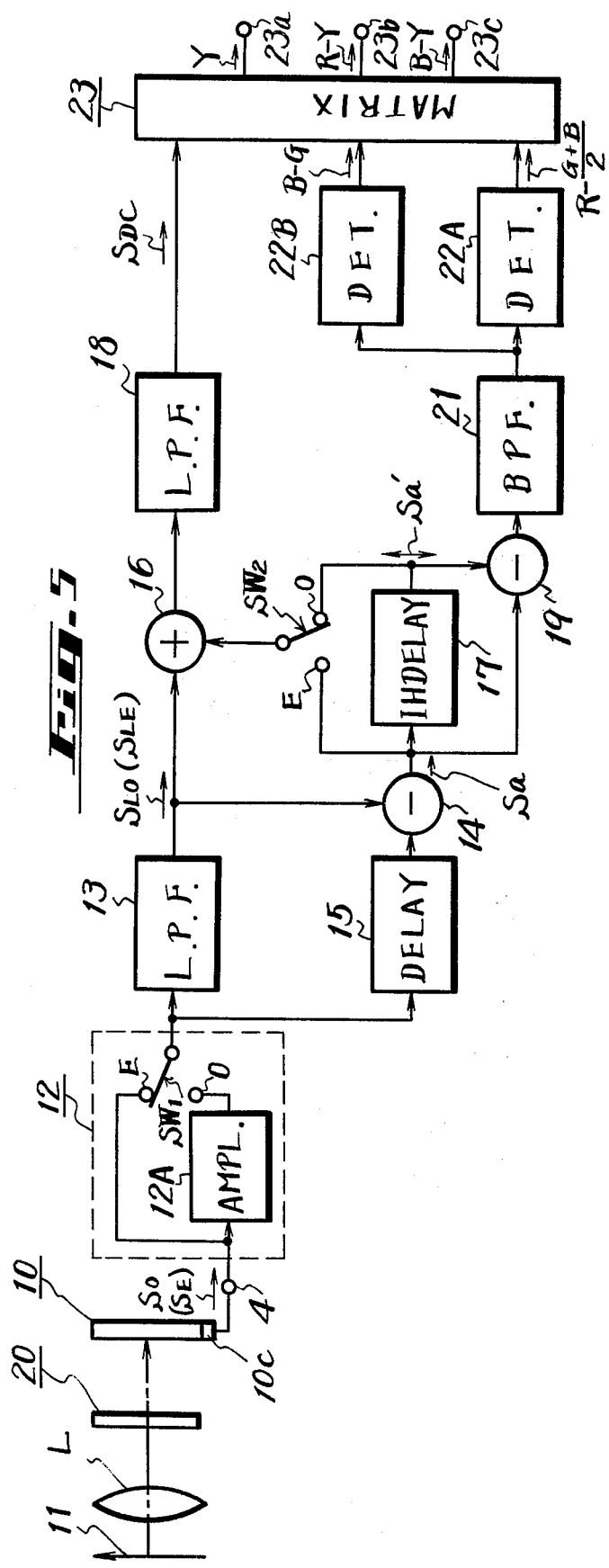

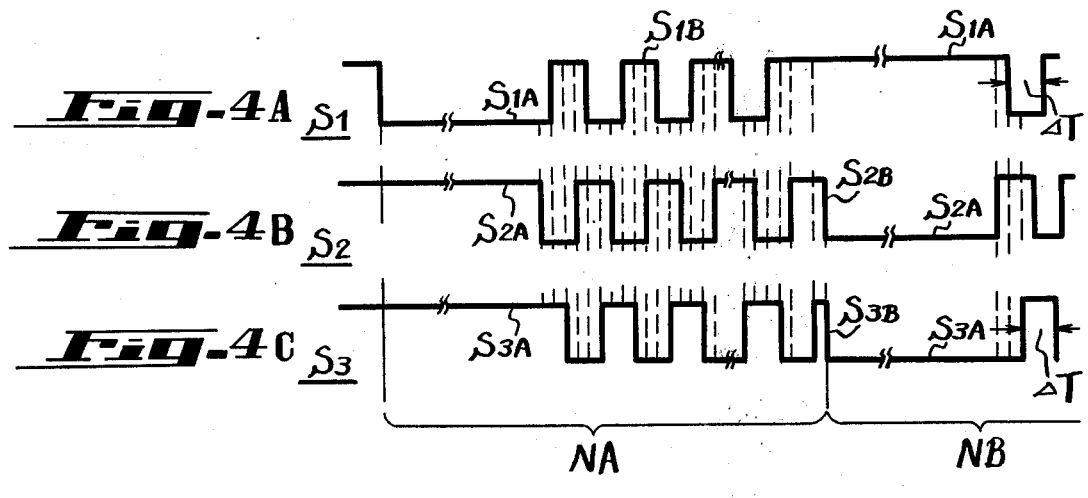
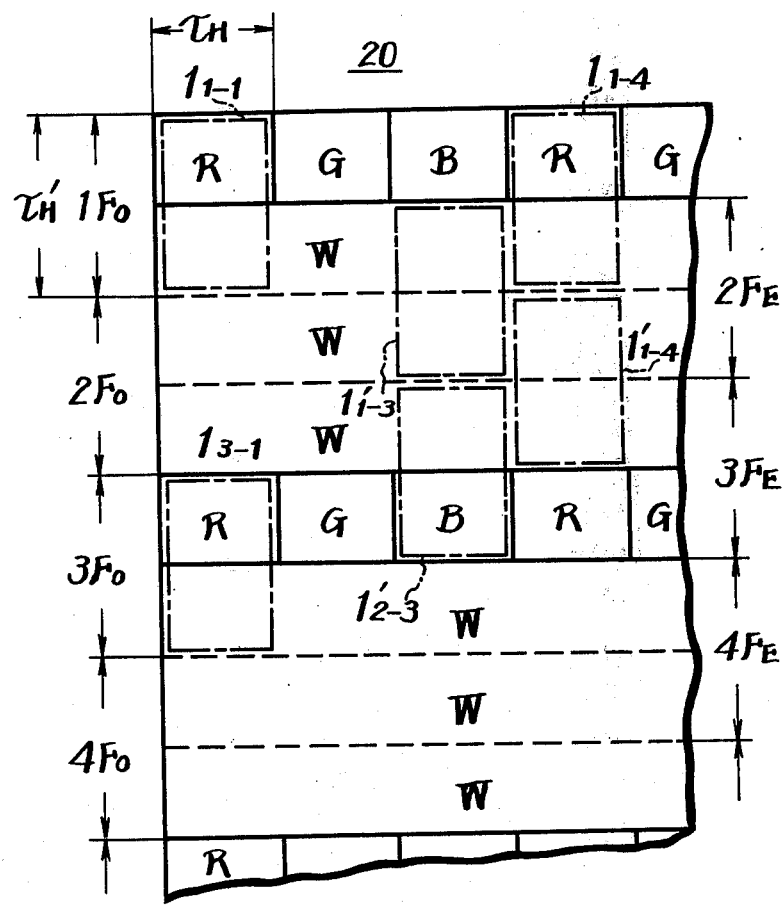

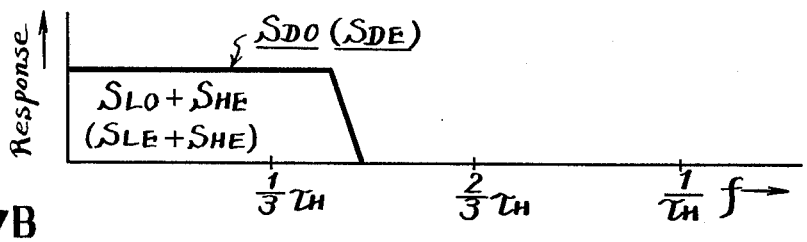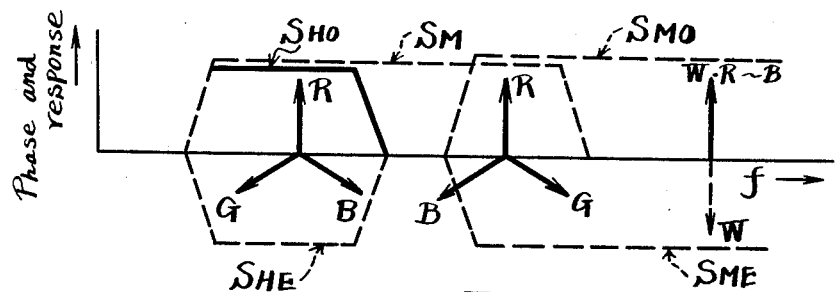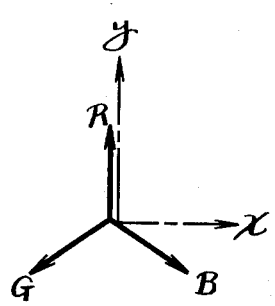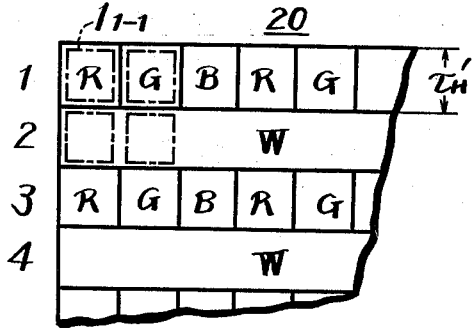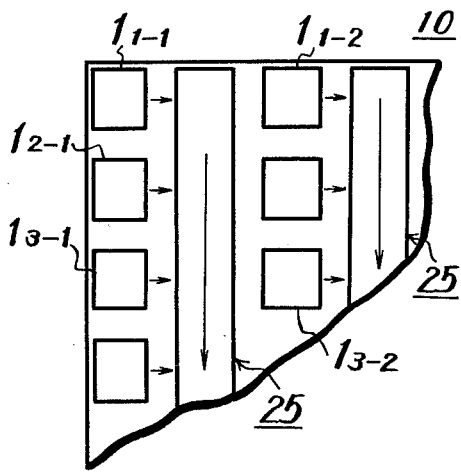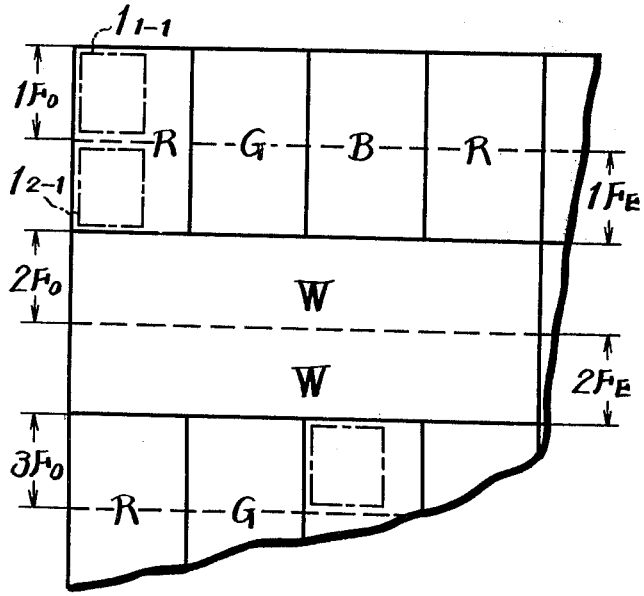

SOLID STATE CAMERA

BACKGROUND OF THE INVENTION

1. Field of the Invention

The present invention relates generally to a solid state color camera, and is directed more particularly to a solid state color camera using a CCD.

2. Description of the Prior Art

When a CCD is used as a camera, input light informations from an object are converted into electrical signals by being sampled at every picture element. Therefore, as opposed to the operation of well-known vidicon tubes, an output signal obtained from sampling every picture element is obtained from the CCD. That is, in the case that the sampling frequency is taken as $f_c$ (if the pitch of picture elements in the horizontal direction of the CCD is taken as $\tau_H$, the sampling frequency $f_c$ becomes $1/\tau_H$), an output video signal $S_Y$, which is obtained during one horizontal period when the respective picture elements are scanned at every horizontal period, includes, a DC component $S_{DC}$ of a luminance signal $S_Y$ and a side band component $S_M$ (AC component) which is produced in such a manner that the sampling frequency $f_c$, as a carrier, is modulated with the DC component $S_{DC}$, as shown in FIG. 1. FIG. 1, however, shows only the fundamental wave thereof. In this case, side bands are extended to lower and upper sides of the side band component $S_M$ having the sampling frequency $f_c$ as the center. If the band of the DC component $S_{DC}$ is selected sufficiently wide so as to avoid any deterioration of resolution, the side band component of the sampling frequency $f_c$ is overlapped on a high band component $S_{DH}$ of the DC component $S_{DC}$ as shown in FIG. 1. Thus, a part with hatches in FIG. 1 is produced as a sampling error. If a picture is reproduced under such a state, the sampling error appears in the reproduced picture as a flicker. In FIG. 1, $S_{DL}$ indicates a low band component of the DC component $S_{DC}$.

Since the flicker is caused by the sampling error, if the band width of the DC component $S_{DC}$ is limited to, for example, smaller than one half of the sampling frequency $f_c$, the sampling error will not be produced and hence the flicker on the reproduced picture can be avoided. However, the limitation of the band width of the DC component $S_{DC}$ accompanies with deterioration of resolution, so that it is not so preferred to limit the band width of the DC component $S_{DC}$. For the band width of the DC component $S_{DC}$ to be selected without deteriorating the resolution (for example, about 3.5 MHz in this embodiment) and to avoid sampling error, it is sufficient to select a high sampling frequency.

Since the sampling frequency $f_c$ is the product of $n$ and $f_H$ ($f_c = n \cdot f_H$), where $n$ is the number of horizontal picture elements in the CCD and $f_H$ the horizontal scanning frequency (practically, effective scanning time in the horizontal scanning direction is taken in consideration), when the sampling frequency $f_c$ is selected high to avoid the occurrence of sampling error as described above, it is required to increase the number, $n$, of picture elements, which causes the CCD to be difficult to manufacture.

SUMMARY OF THE INVENTION

According to the present invention, there is provided a novel solid state color camera which utilizes a two dimensional image device exemplified as a CCD (Charge-coupled device) or the like.

The feature of the solid state color camera of the invention resides in that a signal corresponding to a color component of an object to be picked up in an output signal is modulated at every other line. A signal of relatively high resolution is obtained from a line signal which contains only a luminance signal component, and a color signal component is obtained from the other line signal. Since there is a vertical correlation between the adjacent lines in a video signal, an ordinary composite color video signal or color signals of R(red), G(green) and B(blue) can be sequentially obtained by utilizing the above two signals.

In a preferred embodiment of the invention, the light passed through a color filter is so selected that color components are obtained in line sequence but a luminance component is obtained through the entire area of the filter. In this case, while the luminance component is obtained through the entire area of the filter, side band components, which will cause sampling error, are not mixed with the luminance component. Therefore, a luminance component without sampling error can be always obtained. For this reason, a picture having good quality and stability can be reproduced by this invention.

Further, with the invention the developing of sampling error can be avoided by circuitry of relatively simple construction. This invention is much preferred from a practical point of view. Further, since the low band component is not subjected to an operational treatment even if it is signal-treated, the vertical resolution is not deteriorated.

Since the sampling error can be completely eliminated by the invention, the following feature is achieved. If with the prior art a camera is formed without deteriorating resolution, the band of the luminance signal (band of the DC component) is required to be selected higher than 3.5 MHz. Further, in order to avoid the formation of the sampling error under such a condition, the number $n$ of picture elements in the horizontal scanning direction must be more than 700. If the member $n$ of picture elements becomes large as in the art, the manufacture of a CCD, itself, generally becomes difficult by that amount. For this reason, the prior art camera cannot be made at a low cost. However, with the present invention, if the band of the luminance signal is selected to be sufficiently wide, no sampling error is developed. Therefore, even if the band of the luminance signal is selected to be about 4.0 MHz, the number "$n$" of the picture elements is about 400, which results in a CCD that can be manufactured easily and inexpensively.

Additional objects, features and advantages of the present invention will become apparent from the following description taken in conjunction with the accompanying drawings.

BRIEF DESCRIPTION OF THE DRAWINGS

FIG. 1 is a typical frequency spectrum diagram of an output signal obtained by a camera formed by a CCD;

FIG. 3 is a front view of a part of a color filter which is useable with the CCD shown in FIG. 2;

FIGS. 4A, 4B, and 4C are waveform diagrams of signals used for driving the CCD;

FIG. 5 is an electrical systematic diagram of the solid state color camera according to the present invention;

FIGS. 8 and 10 are partial views of other examples of the color filter which can be adapted in the invention, respectively; and FIG. 9 is a schematic diagram showing a part of a solid state camera of an interline shift system.

DESCRIPTION OF THE PREFERRED EMBODIMENTS

A solid state camera according to the present invention will be hereinafter described with reference to the drawings. In this case, a 3-phase CCD of a frame-shift system is used as a solid state camera.

Figure 2:
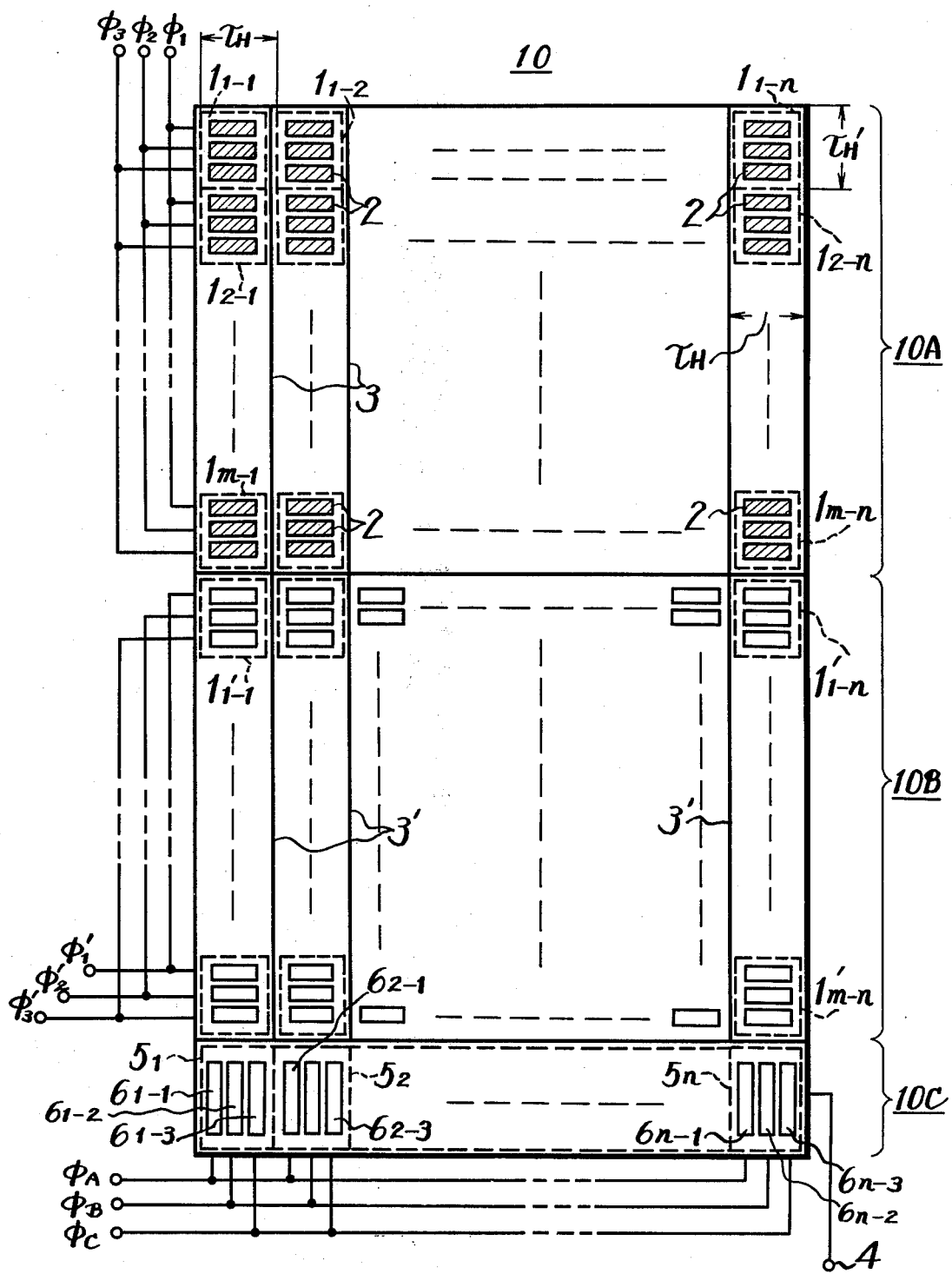
FIG. 2 is a front view of a CCD according to the present invention.

Firstly, the 3-phase CCD will be described with reference to FIG. 2. In FIG. 2, 10 generally designates the CCD. This CCD 10 consists, as is well known, of a photo-sensitive array 10A on which the image of an object to be sensed is projected, a temporary storage array 10B which stores electric charges based upon the light information of the object obtained by the photo-sensitive array 10A, and a read-out register 10C from which the resulting video signal is read out. The photo-sensitive array 10A is formed of a desired number of picture elements $1_{1-1}, 1_{1-2}, ... 1_{1-n}, 1_{2-1}, ... 1_{m-n}$ which are aligned in the horizontal and vertical directions, respectively, at predetermined alignment pitches, $\tau_H$ (in the horizontal direction) and $\tau_H'$ (in the vertical direction), respectively. Each of the picture elements $1_{1-1}, 1_{1-2}, ... 1_{m-n}$ includes three photo-sensing units 2.

Accordingly, when the image is projected onto the photo-sensitive array 10A, electric charges are induced in photo-sensing units 2 of a semiconductor body corresponding to any of electrodes $\phi_1$ to $\phi_3$ which are connected to first to third photo-sensing units 2 of each of picture elements $1_{1-1}, ... 1_{m-n}$, respectively, and are supplied with image sensing biases having a predetermined potential relationship. Then, when a well known transfer clock pulse is supplied to the electrodes $\phi_1$ to $\phi_3$, the electric charges induced in the respective picture elements $1_{1-1} ... 1_{1-n}, 1_{2-1} ... 1_{2-n}, ... 1_{m-1} ... 1_{m-n}$ on the horizontal scanning lines are sequentially stored at every horizontal scanning line on the corresponding horizontal scanning position of the temporary storage array 10B. For this reason, the temporary storage array 10B is formed substantially the same as the photo-sensing array 10A but is optically shielded as a whole. Accordingly, the parts of the temporary storage array 10B corresponding to the photo-sensing array 10A are marked with the same reference numerals and symbols with the addition of a prime (') and their description will be omitted. In FIG. 2, channel stops are shown by the numeral 3.

The charges stored in the temporary storage array 10B are sequentially read out by the read-out register 10C by applying a read-out clock pulse thereto and then deriving an output signal from its output terminal 4. The read-out register 10C consists of read-out sections $5_1, 5_2, ... 5_n$ corresponding to the horizontal picture elements only. Since the read out is accomplished by three-phase clock pulses $\phi_A$ to $\phi_C$, the respective read-out sections $5_1, 5_2, ... 5_n$ include three units $6_{1-1}, 6_{1-2}, 6_{1-3}; 6_{2-1}, 6_{2-2}, 6_{2-3}; ... 6_{n-1}, 6_{n-2}, 6_{n-3}$, respectively.

With the present invention the CCD 10 of a frame-shift system formed as above and a color filter which has a specific color light permeability therethrough are used to produce color components in line sequence manner and also a luminance signal which is obtained throughout the entire CCD, without sampling error by suitable signal treatment.

Next, a color filter which is suited to this invention will be described. This color filter is so selected that color components obtained from odd field and even field areas of the color filter are the same, and color components can be obtained in a line sequence manner at every odd or even horizontal scanning line.

FIG. 3 shows a part of a color filter 30, which will satisfy the above condition. This color filter 20 is so designed that it can be also used in the case of a color interlaced scanning system.

The color filter 20 of FIG. 3 is a type having transverse stripes extending in the horizontal scanning direction. In this case, the picture elements $1_{1-1}, 1_{1-2}, ... 1_{1-n}, 1_{3-1} ... 1_{3-n}, ... (1_{1-1}', 1_{1:2}', 1_{1:3}'...)$ aligned on the odd number horizontal scanning lines (even number horizontal scanning lines may be possible) are divided into two parts with respect to the vertical direction, and the areas of the color filter corresponding to the upper or lower parts of the divided regions or the upper parts in the illustrated example are selected to be different in primary color light permeability as shown in FIG. 3. These parts or regions passing primary color lights therethrough are arranged at a predetermined order in the horizontal scanning direction. Where, the primary color lights mean the red color light, R, green color light G and blue color light, B, as well known, and hence the arrangement of primary colors in the horizontal direction is R-G-B. The other or remaining regions are all selected to pass white color light, W, or made transparent.

In the color filter 20 shown in FIG. 3, $F_O$ designates picture element regions at the odd fields and $n F_O$ designates an $n$-th horizontal scanning region at the odd fields (where $n = 1, 2, ...$ ). Further, $F_E$ indicates the even fields similarly. In FIG. 3, $\tau_H'$ represents the alignment pitch of picture elements in the vertical direction.

If a color filter is constructed as mentioned above, the color components derived from the odd field $F_O$ and those derived from the even field $F_E$ become the same during adjacent horizontal scanning periods (namely, during the fields $n F_O$ and $n F_E$).

The signals required for driving the CCD 10 in interlace manner satisfy the following relationship. That is, the drive signals $S_1, S_2$ and $S_3$ consist of the image sensing bias signals and transfer clock pulses, as shown in FIGS. 4A to 4C. Now, if the odd field period is taken as $N_A$, and the even field period is taken as $N_B$, an electric charge in response to the input light information is induced in the semiconductor body beneath the electrode $\phi_1$ during the period $N_A$, and then is read out, while electric charges in response to the input light information are induced in the semiconductor body beneath the electrodes $\phi_2$ and $\phi_3$, respectively, during the following period $N_B$ and then read out electrically.

To this end, the signals $S_1$ to $S_3$ which will be fed to the electrodes $\phi_1$ to $\phi_3$, have their image sensing bias pulses $S_{1A}, S_{2A}$ and $S_{3A}$ selected in their potential relationship such that only the image sensing pulse $S_{1A}$ is low as compared to the other pulses $S_{2A}$ and $S_{3A}$ as shown in FIGS. 4A to 4C. With this pulse $S_{1A}$, the electric charge in response to the input light information is stored in the semiconductor body beneath the electrode $\phi_1$. The stored charge is transferred for an instant in the vertical direction by the transfer clock pulses $S_{1B}$ to $S_{3B}$ having the transfer time periods of $\Delta T$ and a desired potential relationship among them.

During the next period $N_B$, the pulses $S_{2I}$ and $S_{3A}$ of the driving pulses $S_2$ and $S_3$ are lowered in potential contrary to the above, and electric charges are induced in the semiconductor body beneath the electrodes $\phi_2$ and $\phi_3$. Upon transferring the charges, firstly the charge in the semiconductor body beneath the electrode $\phi_2$ is transferred to that beneath the electrode $\phi_3$ as shown in FIG. 4. Thereafter, the charge is transferred by the transfer clock pulses $S_{1B}$ to $S_{3B}$ similar as during the period $N_A$. As described above, if the position where electric charges are stored in response to the input light information is shifted at the even field, the center of the picture elements in the vertical direction is naturally moved by $\tau_H'/2$ as compared with the case of the odd field. Thus, the content of picture elements which are shifted by $\tau_H'/2$ is obtained as information and hence the interlaced image sensing can be presented.

With reference to FIG. 5, the solid state color camera according to the present invention will be described.

An object 11 to be picked up is projected through an optical lens system L, and the above mentioned color filter 20 onto the CCD 10. Thus, a desired color separated image of the object 11 is projected onto the CCD 10. If an output signal obtained at the odd number horizontal scanning line in the odd field is taken as $S_O$ and that obtained at the even number horizontal scanning line taken as $S_E$, only the output signal $S_O$ contains color components as may be apparent from the color filter 20 shown in FIG. 3. As a result, the color components are obtained at every other horizontal scanning period. That is, the color components are obtained in line-sequence, while the output signal $S_E$, a luminance signal which contains all the color components, is obtained at every horizontal scanning line. Similarly, the color and luminance components are obtained at the even field.

The level of the luminance component in the output signal $S_O$ obtained at the respective fields $F_O$ and $F_E$ is $\frac{2}{3}$ that in the output signal $S_E$, so that the output signal appearing at the output terminal 4 is supplied to a level switching circuit 12 which consists of an amplifier 12A and a switch $SW_1$ which is switched at every horizontal scan to be in contact with contacts O (odd number scanning field) and E (even number scanning field).

Figure 6A:
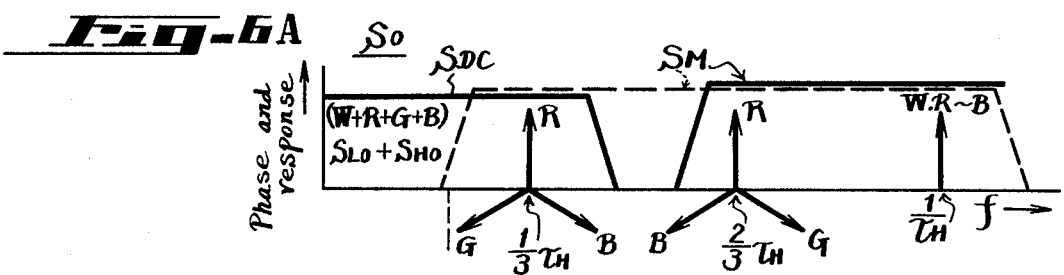
FIGS. 6A to 6C, 6A' to 6C' and FIGS. 7A to 7C, inclusive, are frequency spectrum diagrams including the phase relationship of the output signal.
Figure 6B:
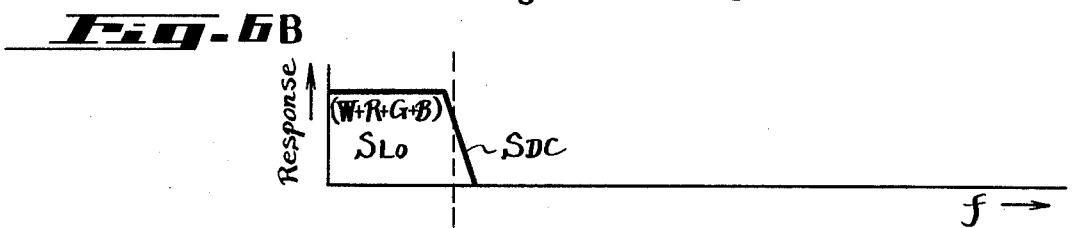
Figure 6C:
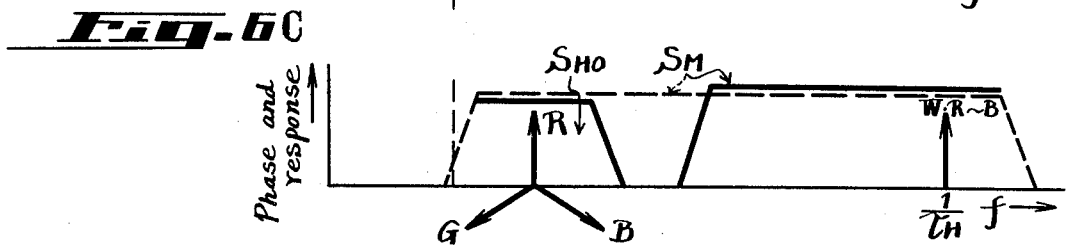
Figure 6A:
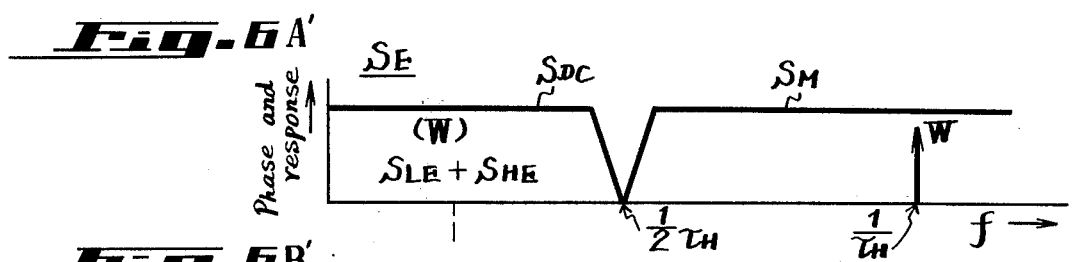
Figure 6B:
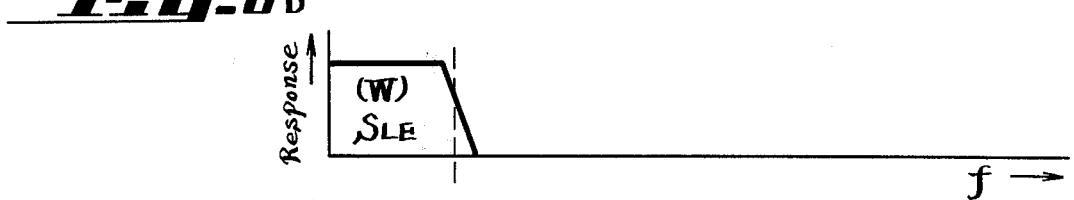
Figure 6C:
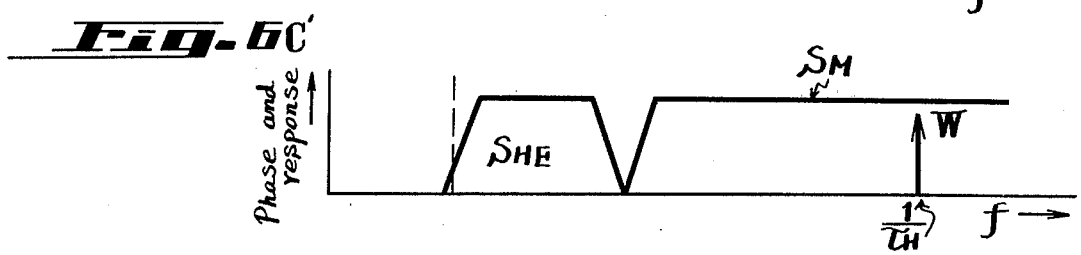

The frequency spectra and the phase relations of the output signals $S_O$ and $S_E$ are shown in FIGS. 6A to 6C and FIGS. 6A' to 6C', respectively.

FIG. 6A relates to the output signal $S_O$, in which the carriers of R, G and B color components are produced at $\frac{2}{3}\cdot\tau_H$ since they are modulated through the respective divided regions. Further, since the respective color components have a phase difference of 120°, the phase relation shown in FIG. 6A is satisfied. The W component is not modulated since no divided region is present, and its carrier frequency is $1/\tau_H$.

FIG. 6A' relates to the output signal $S_E$, in which the output signal $S_E$ is only the luminance component due to the construction of the color filter 20, and hence no carrier is produced at $\frac{2}{3}\cdot\tau_H$. In the symbols $S_{LO}$, $S_{HO}$, $S_{LE}$ and $S_{HE}$ shown in FIGS. 6A to 6C and FIGS. 6A' to 6C', suffix "L" represents the low band component, "H" the high band component, "O" the odd scanning line, and "E" the even scanning line, respectively.

In FIG. 5, the output signals $S_O$ and $S_E$, which are obtained at every horizontal scan, sequentially and alternately from the level switching circuit 12, are supplied to a low pass filter 13 which passes their low band components of about 1.0 to 2.0 MHz (refer to FIGS. 6B and 6B'). The low band components $S_{LO}$ and $S_{LE}$ are supplied to a subtracter 14 which is also supplied with the output signals $S_O$ and $S_E$ which are not limited in band. Subtracted outputs Sa which are obtained from the subtracter 14 and consist of only the high band components are shown in FIGS. 6C and 6C', respectively. In FIG. 5, 15 represents a delay circuit provided between the level switching circuit 12 and subtracter 14, and this delay circuit 15 serves to compensate for the delay of the output signals caused by the presence of the low pass filter 13. The pass band of the low pass filter 13 is so selected that no sampling error is contained in the output signals $S_{LO}$ and $S_{LE}$ passed therethrough or no sampling error is produced by the lower side band component $S_M$ (whose band is shown by the dotted line in FIGS. 6A and 6C) which is produced at the carrier two times of the color component ($\frac{2}{3}\cdot\tau_H$).

The subtracted output signal Sa consisting of only the high band component is supplied to an adder 16 which is also supplied with the output of the low pass filter 13 or the signals $S_{LO}$ and $S_{LE}$ consisting only of the low band components. In this case, the subtracted output Sa which contains the color components is obtained at every horizontal scan, so that there is provided a circuit means to prevent this subtracted output Sa from being supplied to the adder 16. To this end, the subtracted output Sa is delayed through a delay circuit 17 by one horizontal scan as a signal Sa', and thereafter this signal Sa' is supplied to the adder 16 together with the subtracted output Sa, which is not delayed, through a switch $SW_2$ which is switched at every horizontal scan. The switch $SW_2$ is changed to a contact E when the even number horizontal scanning line is scanned, while the switch $SW_2$ is changed to a contact O when the odd number horizontal scanning line is scanned. Therefore, when the switch $SW_2$ is in contact with the contact O, the subtracted output Sa shown in FIG. 6C' and the low band component $S_{LO}$ are applied to the adder 16. As a result, the output from a low pass filter 18 is the DC component $S_{DO}$ only. If this DC component $S_{DO}$ is analyzed, its low band component is the component $S_{LO}$ but its high band component is the high band component in the DC component before each horizontal scan, namely the high band component $S_{HE}$ which had no sampling error (refer to FIG. 7A). On the contrary, when the switch $SW_2$ is in contact with the contact E, the DC component $S_{DE}$ consists of components $S_{LE} + S_{HE}$. Therefore, no overlapping component of the color component is mixed into the DC components $S_{DO}$ and $S_{DE}$ in any case, and hence a DC component containing no sampling error can be obtained. That is, by utilizing the output signals obtained at the adjacent horizontal scanning periods suitably, the DC component $S_{DC}$ having no sampling error can be obtained.

Accordingly, if the non-delayed output Sa and the delayed output Sa' are applied to a subtracter 19, the DC components $S_{DC}$ in the same phase relation are cancelled, and hence only the color components are derived therefrom (refer to FIG. 7B). Due to the construction of the color filter 20, the color components are obtained in line sequence, but if the non-delayed output Sa and delayed output Sa' are utilized as shown in FIG. 5, the color component can be used as the output corresponding to the even number horizontal scanning period. Therefore, from the signal point of view, it can be considered that the color components are obtained from the entire area of the color filter 20.

The color components subjected to the subtracting treatment are supplied through a band pass filter 21 to demodulators or detectors 22A and 22B which have suitable demodulation (detection) axes, respectively, to be demodulated as desired color components. For example, if the demodulation axis of the demodulator 22A is selected as the y-axis (FIG. 7C), the demodulator 22A will demodulate the color component of R — (G+B/2). Similarly, if the demodulation axis of the demodulator 22B is selected as the x-axis (FIG. 7C), the demodulator 22B will demodulate the color component of B-G. Thus, if these color components and the DC component are supplied to a matrix circuit 23, desired output video signals are obtained at its output terminals 23a, 23b and 23c, respectively. For example, the luminance signal Y and color difference signals B-Y and R-Y of the NTSC system can be obtained as the output video signal at the output terminals 23a to 23c.

Modifications of the invention will be now described with reference to the drawings. The above description is given for the case where the invention is used in the interlaced scanning system, but if the invention is used to practice a scanning system other than the interlaced scanning system, the color filter 20 should be constructed as shown in FIG. 8. In this case, since the alignment pitch of picture elements in the vertical direction is $\tau_H'$, the color filter 20 itself can be manufactured easily as compared with that shown in FIG. 3.

Further, the above mentioned CCD 10 is used in the frame shift system, but the CCD 10 shown in FIG. 9 used in an interline-shift system can be employed. The CCD 10 of this system has shift registers 25 which are extended in the vertical direction in a number which is same as that of picture elements in the horizontal direction. The description of the other constructions will be omitted.

The color filter 20 constructed as shown in FIG. 10 can be used in the invention. When this color filter 20 is used, if two picture elements aligned in the vertical direction are taken as a set, a unit light permeable area of the color filter 20 is formed to cover the two picture elements, the odd (or even) number light permeable area is divided into a plurality of regions with respect to the horizontal scanning direction and also the scanning areas at the respective fields are selected as shown in FIG. 10.

With the employment of the color filter 20 shown in FIG. 10, the same effect as that described above can be performed.

It will be apparent that many modifications and variations could be effected by one skilled in the art without departing from the spirit or scope of the novel concepts of the present invention as determined by the appended claims.

We claim as our invention:

1. A solid state color camera employing a solid state image receiving device having a plurality of picture elements aligned in both horizontal and vertical directions, comprising:
   a. means for projecting an image of an object on said solid state image receiving device;
   b. means for developing and storing electrical information corresponding to the image displayed on said picture elements;
   c. means for reading said information line-by-line in sequence; and
   d. color filter means disposed between said solid state image receiving device and said image projecting means for producing a color signal component only at every other line of picture elements.

2. A solid state color camera as cited in claim 1 further comprising means for delaying said output image information by one line interval to apply said color signal component to a line where no color signal component is obtained.

3. A solid state color camera as cited in claim 1 wherein said color filter means is further arranged to have a color transmissive portion and a transparent portion adjacent to the line from where the image information including the color signal component is obtained.

4. A solid state color camera as cited in claim 2 wherein said delaying means is also used for supplying a luminance signal component to the line from which said color signal component is obtained.

5. A solid state color camera as cited in claim 1 wherein said solid state image receiving device is formed of a charge coupled device of a frame transfer type.

6. A solid state color camera as cited in claim 1 wherein said solid state image receiving device is formed of a charge coupled device of an interlined shift type.

7. A solid state color camera as cited in claim 1 wherein said plurality of picture elements are positioned to be in an overlapping arrangement such that the picture elements at the odd and even fields commonly include said color filter means when an interlaced relation is employed in receiving an image.

* * * * *